(12) United States Patent
Lee

(10) Patent No.: US 7,906,960 B2
(45) Date of Patent: Mar. 15, 2011

(54) INDUCTIVE POSITION SENSOR

(75) Inventor: Joong K. Lee, Chatham (CA)

(73) Assignee: KSR Technologies Co., Ridgetown (CA)

( * ) Notice: Subject to any disclaimer, the term of this patent is extended or adjusted under 35 U.S.C. 154(b) by 311 days.

(21) Appl. No.: 12/211,360

(22) Filed: Sep. 16, 2008

(65) Prior Publication Data

US 2009/0079422 A1     Mar. 26, 2009

Related U.S. Application Data

(60) Provisional application No. 60/974,206, filed on Sep. 21, 2007.

(51) Int. Cl.
*G01B 7/30* (2006.01)

(52) U.S. Cl. ............................... 324/207.25; 324/207.17

(58) Field of Classification Search ............... 324/207.15 –207.19, 207.25, 256–258; 73/514.31, 514.39; 336/30, 45; 33/706, 708
See application file for complete search history.

(56) References Cited

U.S. PATENT DOCUMENTS

| | | | | |
|---|---|---|---|---|
| 6,448,759 B2 * | 9/2002 | Madni et al. | ............. | 324/207.17 |
| 7,276,897 B2 * | 10/2007 | Lee | ........................ | 324/207.17 |

* cited by examiner

*Primary Examiner* — Bot L LeDynh
(74) *Attorney, Agent, or Firm* — Gifford, Krass, Sprinkle, Anderson & Citkowski, P.C.

(57) ABSTRACT

A position sensor having a transmitter coil with both an outer loop portion and an inner loop portion. A receiver coil is disposed in close proximity to the transmitter coil and the receiver coil includes a first loop and an oppositely wound second loop. The receiver coil generates an electrical output signal when the transmitter coil is excited due to the inductive coupling between the transmitter and receiver coils. A movable coupler element varies the inductive coupling between the transmitter coil and the loops of the receiver coil as a function of the position of the coupler element.

12 Claims, 3 Drawing Sheets

INDUCTIVE POSITION SENSOR

CROSS REFERENCE TO RELATED APPLICATIONS

This application claims priority of U.S. Provisional Patent Application Ser. No. 60/974,206 filed Sep. 21, 2007, which is incorporated herein by reference.

BACKGROUND OF THE INVENTION

I. Field of the Invention

The present invention relates generally to position sensors and, more particularly, to an inductive position sensor.

II. Description of Related Art

In automotive vehicles, the throttle pedal has traditionally been mechanically connected to the engine throttle by a cable. In more modern vehicles, however, a throttle position sensor is mechanically connected to the pedal and generates an electrical output signal indicative of the degree of depression of the throttle pedal. Such systems are oftentimes termed "fly-by-wire" systems.

In one type of throttle position sensor, a transmitter or exciter coil is excited by a high frequency source so that the transmitter coil generates electromagnetic radiation. This transmitter coil, furthermore, is arranged in a circular pattern although other pattern configurations may alternatively be used.

A receiver coil is also disposed in the position sensor in close proximity to the transmitter coil. Consequently, upon energization of the transmitter coil the receiver coil generates an output signal due to inductive coupling between the transmitter and the receiver coil.

Unlike the transmitter coil, however, the receiver coil includes a first loop and a second loop which is oppositely wound from the first loop. Consequently, the inductive coupling between the transmitter coil and the first loop of the receiver coil generates a voltage opposite in polarity from the voltage induced by the transmitter coil in the second loop of the receiver coil. Therefore, the receiver output signal is a combination or sum of the voltage signals from the first and second loops of the receiver coil.

In order to generate an output signal representative of the position of the throttle, a coupler element is rotatably mounted to the position sensor and rotates in synchronism with the depression and release of the throttle pedal. This coupler element, furthermore, is constructed of a material which conducts the electromagnetic radiation emitted by the transmitter coil. This coupler element overlies a portion of both the transmitter and the receiver coils. Consequently, upon movement or rotation of the coupler element, the inductive coupling between the transmitter and tie first and second loops of the receiver coil is varied. This in turn produces an output signal from the receiver coil which varies as a function of the angular position of the coupler element and thus the angular position of the throttle pedal which is mechanically coupled to the coupler element.

If the coupler element is precisely concentric with the transmitter and receiver coils, and if the space between the coupler element and the transmitter and receiver coils remains constant during the entire movement of the coupler element, the output from the receiver coil provides a precise indication of the angular position of the coupler element and thus the angular position of the throttle pedal. In practice, however, manufacturing tolerances during the manufacture of the throttle position sensor oftentimes produce a throttle position sensor in which the coupler element is not precisely concentric with the transmitter and receiver coils and/or the gap spacing between the coupler element and the receiver and transmitter coils varies somewhat from the desired gap spacing.

Different strategies have been employed to compensate for lack of concentricity between the pivotal axis of the coupler element and the axis of the transmitter and receiver coils. These strategies, however, have not been adequate to compensate for variations in the gap spacing between the coupler element and the transmitter and receiver coils to meet the accuracy requirements of the throttle position sensor.

SUMMARY OF THE PRESENT INVENTION

The present invention provides a throttle position sensor which overcomes the above-mentioned disadvantages of the previously known throttle position sensors.

In brief, the throttle position sensor of the present invention includes a transmitter coil which is wound in a circular configuration. The transmitter coil is energized by a high frequency alternating current source so that, when energized, the transmitter coil generates electromagnetic radiation.

A receiver coil is also provided in the throttle position sensor in close proximity to the transmitter coil. The receiver coil includes first and second oppositely wound loops which are electrically connected in series with each other. However, since the first and second loops of the receiver coil are oppositely wound from each other, the voltage induced by the transmitter coil when energized in the first loop will be opposite in polarity than the voltage induced in the second receiver loop by the transmitter coil. The sum of the voltages in the receiver loops forms the output signal from the throttle position sensor.

A coupler element is movably mounted relative to the transmitter and receiver coils. This coupler element varies the inductive coupling through a transmitter coil and the first and second loops of the receiver coil as a function of the angular position of the coupler element. The angular position of the coupler element, in turn, varies as a function of the position of the throttle pedal. For example, rotational movement of the coupler element in one direction may increase the inductive coupling between the transmitter coil and the first loop of the receiver coil and simultaneously decrease the inductive coupling between the transmitter coil and the second loop of the receiver coil thus varying the output signal from the receiver coil. Rotation of the coupler element in the opposite rotational direction produces the opposite effect.

In order to compensate for gap variations between the coupler element and the transmitter and receiver coils, the transmitter coil includes both an outer loop portion and an inner loop portion which is spaced radially inwardly from the outer loop portion. An axial modulator or reference coil is then wound in between the inner and outer portions of the transmitter coil while the receiver coil overlies at least a portion of the outer loop of the transmitter coil. In practice the provision of the inner loop of the transmitter coil compensates for variations in the gap between the coupler element and the transmitter and receiver coils by providing additional inductive coupling between the transmitter coil and the reference coil.

BRIEF DESCRIPTION OF THE DRAWING

A better understanding of the present invention will be had upon reference to the following detailed description when read in conjunction with the accompanying drawing, wherein lice reference characters refer to like parts throughout the several views, and in which.

DETAILED DESCRIPTION OF A PREFERRED EMBODIMENT OF THE PRESENT INVENTION

Figure 1:
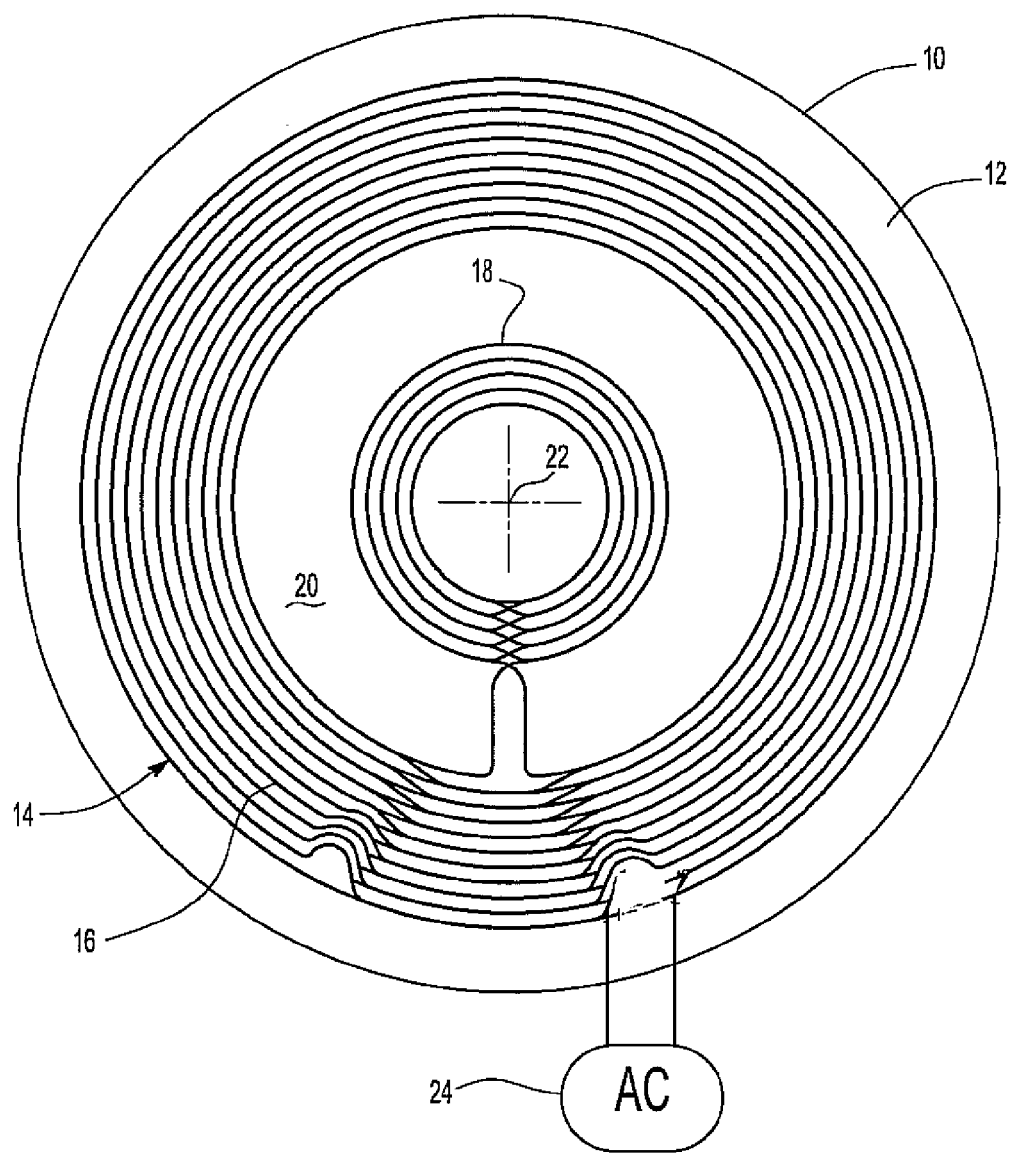
FIG. 1 is a plan view of a printed circuit board containing the transmitter coil.

With reference first to FIG. 1, a portion of a throttle position sensor 10 is shown with parts of the throttle position sensor 10 removed for clarity. The throttle position sensor 10 includes a printed circuit board 12 which is typically contained within a housing 15 (FIG. 4) to protect the printed circuit board 12 from contaminants and/or other damage.

A transmitter coil 14 is formed on the printed circuit board 12 in the conventional fashion. This transmitter coil 14 includes an outer loop portion 16 as well as an inner loop portion 18. Both the outer loop portion 16 and inner loop portion 18 of the transmitter coil are wound in a circular configuration about an axis 22 and all windings of the transmitter coil 14 in both the outer loop portion 16 and inner loop portion 18 are oriented in the same rotational direction.

Still referring to FIG. 1, the ends of the transmitter coil 14 are coupled to a high frequency alternating current source 24. Once the alternating current source 24 is activated or energized, both the outer loop portion 16 and inner loop portion 18 of the transmitter coil 14 generate electromagnetic radiation in the well-known fashion.

Figure 2:
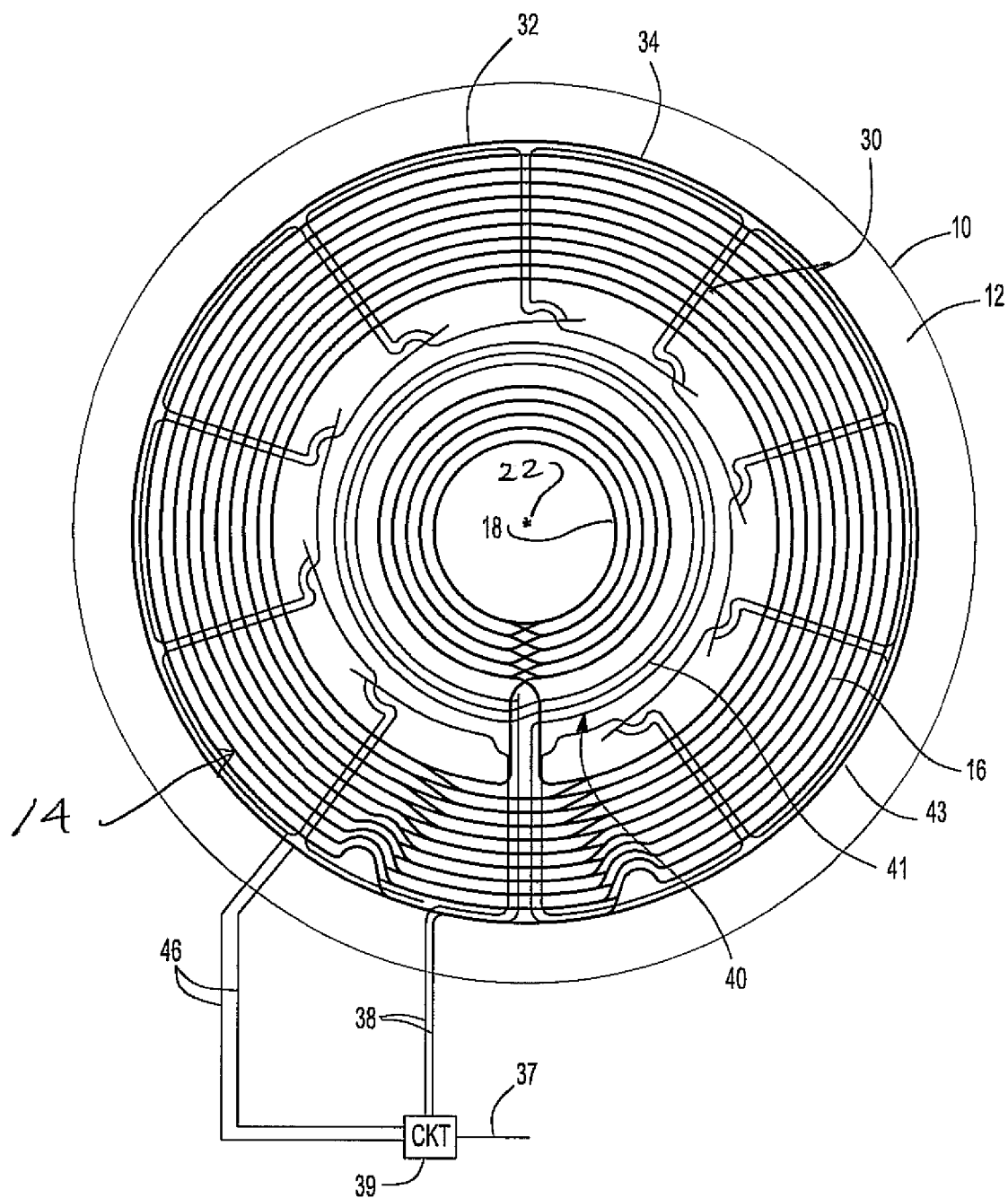
FIG. 2 is a plan view of the printed circuit board with the transmitter coil, receiver coil and reference coil.
Figure 3:
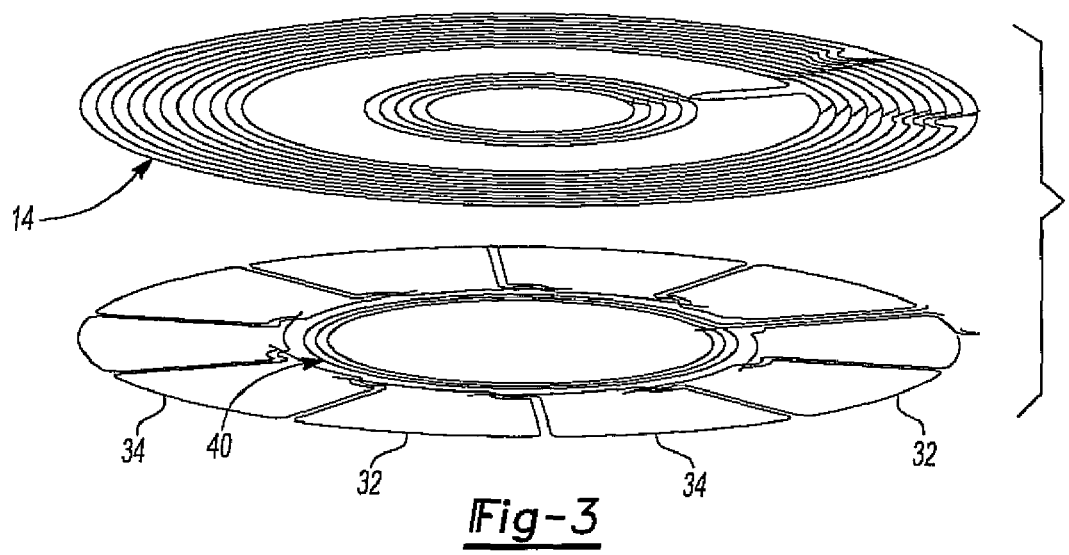
FIG. 3 is an exploded view of a preferred embodiment of the sensor of the present invention.

With reference now to FIGS. 2 and 3, a receiver coil 30 having at least two oppositely wound loops 32 and 34 is also formed on the printed circuit board 12 utilizing conventional printed circuit board manufacturing techniques so that the receiver coil is positioned in close proximity with the outer loop portion 16 of the transmitter coil 14. Furthermore, the receiver coil is illustrated in FIGS. 2 and 3 as containing five clockwise wound sections 32 and five counterclockwise wound sections 34 such that the sections 32 and 34 are equal in angular size and alternate from each other around the axis 22 on the printed circuit board 12. However, the five pole configuration illustrated in FIGS. 2 and 3 is by way of example only and no undue limitation should be drawn therefrom. Rather, it is only necessary that the receiver coil have at least two oppositely wound loops 32 and 34.

All loops 32 and 34 of the receiver coil 30 are electrically connected in series with each other. Consequently, a voltage on the output 38 of the receiver coil is equal to the sum of voltages of all of the receiver loops 32 and 34 of the receiver coil 30. The receiver outputs 38 are connected to a circuit 39, typically an ASIC, which processes and linearizes the output from the receiver coil 30.

Still referring to FIGS. 2 and 3, a reference or axial modulator coil 40 is also formed on the printed circuit board 12 utilizing conventional printed circuit board manufacturing techniques. The reference coil 40 has an inner loop portion 41 positioned in between the inner and outer portions 16 and 18 of the transmitter coil 14 and an outer and oppositely wound loop 43 positioned on the printed circuit board 12 around the outer periphery of the receiver coil 30. Both loops 41 and 43 of the receiver coil 40 are inductively coupled to the transmitter coil 14 that are differential or oppositely wound with respect to each other. Thus, upon excitation of the transmitter coil 14, the transmitter coil induces a voltage in both loops 41 and 43 of the reference coil 40. However, the polarity of the voltage induced in the coil 41 of the reference coil 40 is opposite in polarity than the voltage induced in the second loop 43 of the reference coil 40.

The loops 41 and 43 of the reference coil 40 are electrically connected in series with each other so that the outputs 46 from the reference coil 40 contain the sum or differential of the voltages on the loops 41 and 43 of the reference coil 40. Electrical outputs 46 from the reference coil 40 are also connected to the circuit 39.

Figure 4:
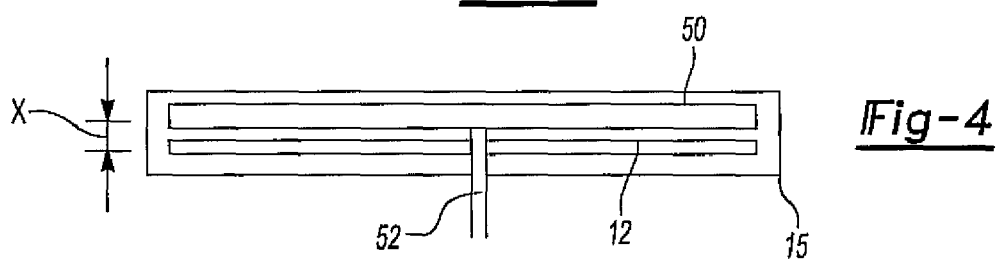
FIG. 4 is a side diagrammatic view of a preferred embodiment of the present invention.
Figure 5:
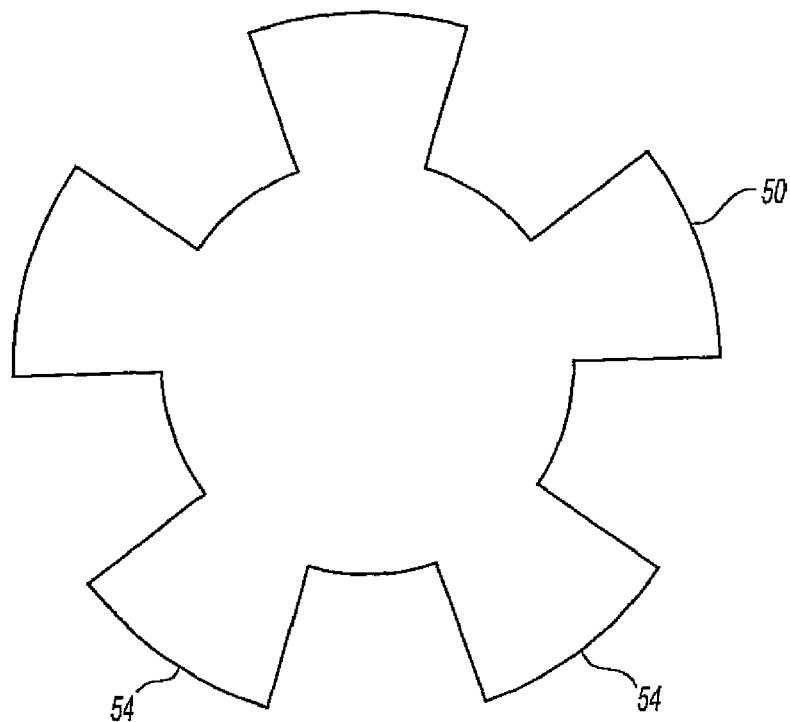
FIG. 5 is a plan view of an exemplary coupler element.

With reference now to FIGS. 4 and 5, a coupler element 50 is positioned within the housing 15 so that the coupler element 50 overlies the printed circuit board 12 but is spaced away from the printed circuit board 12 by a gap x. This coupler element 50, furthermore, is rotatably mounted to the housing by a shaft 52 which is coaxial with the axis 22 (FIG. 1) of the transmitter coil 14.

The coupler element 50 illustrated in FIGS. 4 and 5 is shown as having five lobes 54 which correspond in size and shape to the loops 32 and 34 of the receiver coil 30. It will again be understood that the coupler element 50 illustrated in FIG. 5 is by way of illustration only for a five pole position sensor. The position sensor may contain fewer or more poles without deviation from the spirit or scope of the invention.

The coupler element 50 is constructed of a material which is conductive to the electromagnetic radiation generated by the transmitter coil 14 when energized by the high frequency current source 24 (FIG. 1). Thus, the coupler element 50, and especially the lobes 54 of the coupler element, vary the inductive coupling between the transmitter coil and the loops 32 and 34 of the receiver coil 30 underlying the coupler 50.

Consequently, rotation of the coupler element 50 in one rotational direction will increase the inductive coupling between the transmitter coil 14 and the first loop 32 of the receiver coil 30 while simultaneously decreasing the inductive coupling between the transmitter coil 14 and the second loop 34 of the receiver coil 30. Rotation of the coupler element 50 in the opposite rotational direction will produce the opposite effect.

In either event, by varying the inductive coupling between the oppositely wound coils 32 and 34 of the receiver coil 30 as a function of the rotational position of the coupler element 50, the output voltage on the receiver coil outputs 38 will likewise vary thus producing a signal indicative of the rotational position of the coupler element 50 and processed by the circuit 39 to linearize and otherwise process the output signal. The coupler element 50, in turn, is mechanically coupled to a component of the throttle so that the output signal from the sensor 10 is indicative of the position of the throttle.

Although the inductive coupling between the transmitter coil 14 and the loops 32 and 34 of the receiver coil 30 vary as a function of the rotational position of the coupler element 50, the inductive coupling between the transmitter coil 14 and the loops 41 and 43 of the reference coil 40 is independent and does not vary as a function of the rotational position of the coupler element 50. The inductive coupling between the oppositely wound loops 41 and 43 of the reference coil 40 does, however, vary as a function of the gap x between the coupler element 50 and the reference coil 40.

It has been found that the additional inductive coupling provided by the inner portion 18 of the transmitter coil 14 with the reference coil 40 maintains the ratiometric function R(x) substantially constant despite reasonably small variations in the gap spacing x where R(x) is defined as follows:

$$R(x)=RM(x)/AM(x)$$

where RM equals the outputs from the receiver coil 30 and AM equals the voltage on the outputs 46 from the reference coil 40 and x equals the magnitude of the gap between the coupler element 50 and the printed circuit board 12.

In practice, the function R remains substantially constant despite reasonable variations in the gap x between the coupler element 50 and the transmitter and receiver coils 14 and 30, respectively, on the printed circuit board 12. This, in turn, improves the overall accuracy of the throttle position sensor 10.

From the foregoing, it can be seen that the present invention provides a simple and yet highly effective position sensor, such as a throttle position sensor, although the sensor may be used in other applications. Having described my invention, however, many modifications thereto will become apparent to those skilled in the art to which it pertains without deviation from the spirit of the invention as defined by the scope of the appended claims.

I claim:

1. A position sensor comprising:
   a transmitter coil having an outer loop portion and an inner loop portion, said transmitter coil generating electromagnetic radiation when excited by a source of electrical energy,
   a receiver coil disposed in close proximity with at least one of said transmitter inner and outer loop portions, said receiver coil having at least a first loop and an oppositely wound second loop, said receiver coil generating an electrical output signal when said transmitter coil is excited due to inductive coupling between said transmitter coil and said receiver coil,
   a movable coupler element which varies the inductive coupling between said transmitter coil and said loops of said receiver coil as a function of the position of said coupler element to thereby vary the electrical output signal from said receiver coil,
   a reference coil disposed between said inner and outer loop portions of said transmitter coil, said reference coil generating an electrical output reference signal when said transmitter coil is excited due to inductive coupling between said transmitter coil and said reference coil which coupling is independent of the position of said coupler element.

2. The invention as defined in claim 1 wherein said transmitter coil is formed on a printed circuit board.

3. The invention as defined in claim 1 wherein said inner and outer loop portions of said transmitter coil are wound in concentric circular patterns.

4. The invention as defined in claim 1 wherein said receiver coil is formed on a printed circuit board.

5. The invention as defined in claim 1 wherein said reference coil is formed on a printed circuit board.

6. The invention as defined in claim 1 wherein said coupler element is metallic.

7. The invention as defined in claim 1 wherein said receiver coil overlies said outer loop portion of said transmitter coil.

8. The invention as defined in claim 1 wherein said coupler element is rotatable about an axis relative to said transmitter coil.

9. The invention as defined in claim 1 wherein said receiver coil is arranged in alternating sections of said first loop and said second loop of said receiver coil.

10. The invention as defined in claim 9 wherein said alternating sections of said receiver coil are arranged in a circular pattern about a predetermined axis.

11. The invention as defined in claim 10 wherein said coupler element is rotatable about said predetermined axis.

12. The invention as defined in claim 1 wherein said transmitter coil, said receiver coil and said reference coil are all formed on a printed circuit board.

\* \* \* \* \*